US008130092B2

(12) United States Patent
Shiraki

(10) Patent No.: US 8,130,092 B2
(45) Date of Patent: Mar. 6, 2012

(54) INTER-VEHICLE COMMUNICATION DEVICE FOR COMMUNICATING OTHER VEHICLES AND METHOD FOR COMMUNICATING BETWEEN VEHICLES

(75) Inventor: Hidenao Shiraki, Ogaki (JP)

(73) Assignee: Denso Corporation, Kariya (JP)

( * ) Notice: Subject to any disclaimer, the term of this patent is extended or adjusted under 35 U.S.C. 154(b) by 569 days.

(21) Appl. No.: 12/378,995

(22) Filed: Feb. 20, 2009

(65) Prior Publication Data

US 2009/0212934 A1 Aug. 27, 2009

(30) Foreign Application Priority Data

Feb. 22, 2008 (JP) ................................ 2008-041358

(51) Int. Cl.
*B60Q 1/26* (2006.01)

(52) U.S. Cl. ........ 340/466; 340/902; 340/903; 340/904; 340/905; 340/933; 340/935; 340/436; 340/435

(58) Field of Classification Search .................. 340/902, 340/903, 904, 933, 935, 436
See application file for complete search history.

(56) References Cited

U.S. PATENT DOCUMENTS 6,011,461 A * 1/2000 Luper .......................... 340/441
2002/0075145 A1* 6/2002 Hardman et al. ............ 340/442
2006/0155427 A1* 7/2006 Yang ................................ 701/1

FOREIGN PATENT DOCUMENTS

JP 5-266399 10/1993
JP 2000-090395 3/2000
JP 2005-352971 12/2005
JP 2007-323184 12/2007

OTHER PUBLICATIONS

Wireless Broadband Promotion Committee, ITS Technical Subcommittee, Japan Automobile Manufacturers Association, Inc., Jul. 8, 2005.

Office Action dated Apr. 13, 2010 in Japanese Application No. 2008-041358 with English translation thereof.

* cited by examiner

*Primary Examiner* — Daryl Pope

(74) *Attorney, Agent, or Firm* — Harness, Dickey & Pierce, PLC

(57) ABSTRACT

An inter-vehicle communication device for a vehicle includes: a transmission element for transmitting information about the vehicle to other vehicles with a predetermined period; a transmission controller for controlling the transmission element; and a detector for detecting a state of an indicator in the vehicle. The indicator informs a person around the vehicle about a state and existence of the vehicle, and the transmission controller controls the transmission element to transmit the information with a period shorter than the predetermined period when the detector detects that the indicator functions.

10 Claims, 6 Drawing Sheets

INTER-VEHICLE COMMUNICATION DEVICE FOR COMMUNICATING OTHER VEHICLES AND METHOD FOR COMMUNICATING BETWEEN VEHICLES

CROSS REFERENCE TO RELATED APPLICATION

This application is based on Japanese Patent Application No. 2008-41358 filed on Feb. 22, 2008, the disclosure of which is incorporated herein by reference.

FIELD OF THE INVENTION

The present invention relates to an inter-vehicle communication device for communicating other vehicles and a method for communicating between vehicles.

BACKGROUND OF THE INVENTION

An inter-vehicle communication device is mounted on a vehicle. The device transmits information such as a position of the vehicle to other vehicles disposed around the vehicle. Further, the device receives information such as a position of another vehicle from the other vehicle.

For example, JP-A-2000-90395 discloses a device for transmitting information relating to a vehicle with a short period when the vehicle runs at high speed. The device transmits the information with a long period when the vehicle runs at low speed.

Two vehicles approach each other when the two vehicles run on the same road. In this case, when at least one vehicle runs at low speed, the one vehicle, i.e., the slow driving vehicle transmits the information with a short period by the device disclosed in JP-A-2000-90395. Therefore, the other vehicle may receive the information late from the slow driving vehicle. Thus, a driver in the other vehicle may recognize existence of the slow driving vehicle late. If the road has a traffic jam, and vehicles stop or run at very low speed, another vehicle approaches from behind the vehicles, the other vehicle may crash into rearmost one of the vehicles. The rearmost one of the vehicles runs at very low speed, and is arranged on the rearmost of the vehicles.

Further, when a vehicle turns right or left, the vehicle may runs at low speed or stop temporary. In this case, the device in the vehicle transmits the information with a long period. Thus, another vehicle may receive the information late. Thus, another driver in the other vehicle may recognize existence of the vehicle late, the vehicle turning right or left.

The present inventor has studied about the above situation. FIGS. 7A and 7B show a certain situation according to a related art. In FIG. 7A, three vehicles A, B, C stop or run at very low speed. Here, the very low speed means that the vehicle goes at a crawl. The three vehicles A, B, C provide a group of slow driving vehicles. Another vehicle D approaches from behind of the slow driving vehicles A, B, C. If an inter-vehicle communication device in one of the slow driving vehicles A, B, C transmits information to the other vehicle D with a long period, a driver in the other vehicle D may recognize existence of the slow driving vehicles A, B, C late.

In FIG. 7B, vehicles E-G approach the same intersection. A vehicle G stops in the intersection to turn left at the intersection after two vehicles E, F go through the intersection. Alternatively, the vehicle G may enter the intersection at very low speed. If an inter-vehicle communication device in the vehicle G transmits information to the other vehicles E, F with a long period, a driver in the other vehicle E, F may recognize existence of the vehicle G late.

SUMMARY OF THE INVENTION

In view of the above-described problem, it is an object of the present disclosure to provide an inter-vehicle communication device for communicating other vehicles. It is another object of the present disclosure to provide a method for communicating between vehicles.

According to a first aspect of the present disclosure, an inter-vehicle communication device for a vehicle includes: a transmission element for transmitting information about the vehicle to other vehicles with a predetermined period; a transmission controller for controlling the transmission element; and a detector for detecting a state of an indicator in the vehicle. The indicator informs a person around the vehicle about a state and existence of the vehicle, and the transmission controller controls the transmission element to transmit the information with a period shorter than the predetermined period when the detector detects that the indicator functions.

The indicator shows the state of the vehicle and the existence of the vehicle to the vehicles. Since the transmission controller controls the transmission element to transmit the information with a period shorter than the predetermined period when the detector detects that the indicator functions, the existence of the vehicle is informed to the other vehicles immediately.

According to a second aspect of the present disclosure, a method for communicating between vehicles includes: obtaining information about a vehicle; detecting a speed of the vehicle; calculating a transmission period as a first transmission period when the speed of the vehicle is not larger than a predetermined value; calculating the transmission period as a second transmission period when the speed of the vehicle is larger than the predetermined value, wherein the second transmission period is shorter than the first transmission period; transmitting the information about the vehicle to other vehicles with the calculated transmission period; determining whether a hazard indicator turns on; determining whether the speed of the vehicle is larger than the predetermined value; maintaining the calculated transmission period when the hazard indicator does not turn on or the vehicle speed is larger than the predetermined value; and changing the calculated transmission period to the second transmission period when the hazard indicator turns on and the vehicle speed is not larger than the predetermined value.

The above method provides to inform the existence of the vehicle to the other vehicles immediately.

According to a third aspect of the present disclosure, a method for communicating between vehicles includes: obtaining information about a vehicle; detecting a speed of the vehicle; calculating a transmission period as a first transmission period when the speed of the vehicle is not larger than a predetermined value; calculating the transmission period as a second transmission period when the speed of the vehicle is larger than the predetermined value, wherein the second transmission period is shorter than the first transmission period; transmitting the information about the vehicle to other vehicles with the calculated transmission period; determining whether a blinker indicator turns on; determining whether a brake device functions; determining whether the speed of the vehicle is larger than the predetermined value; maintaining the calculated transmission period when the blinker does not turn on, the brake device does not function, or the vehicle speed is larger than the predetermined value; and changing the calculated transmission period to the second transmission period when the blinker turns on, the brake device functions, and the vehicle speed is not larger than the predetermined value.

The above method provides to inform the existence of the vehicle to the other vehicles immediately.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
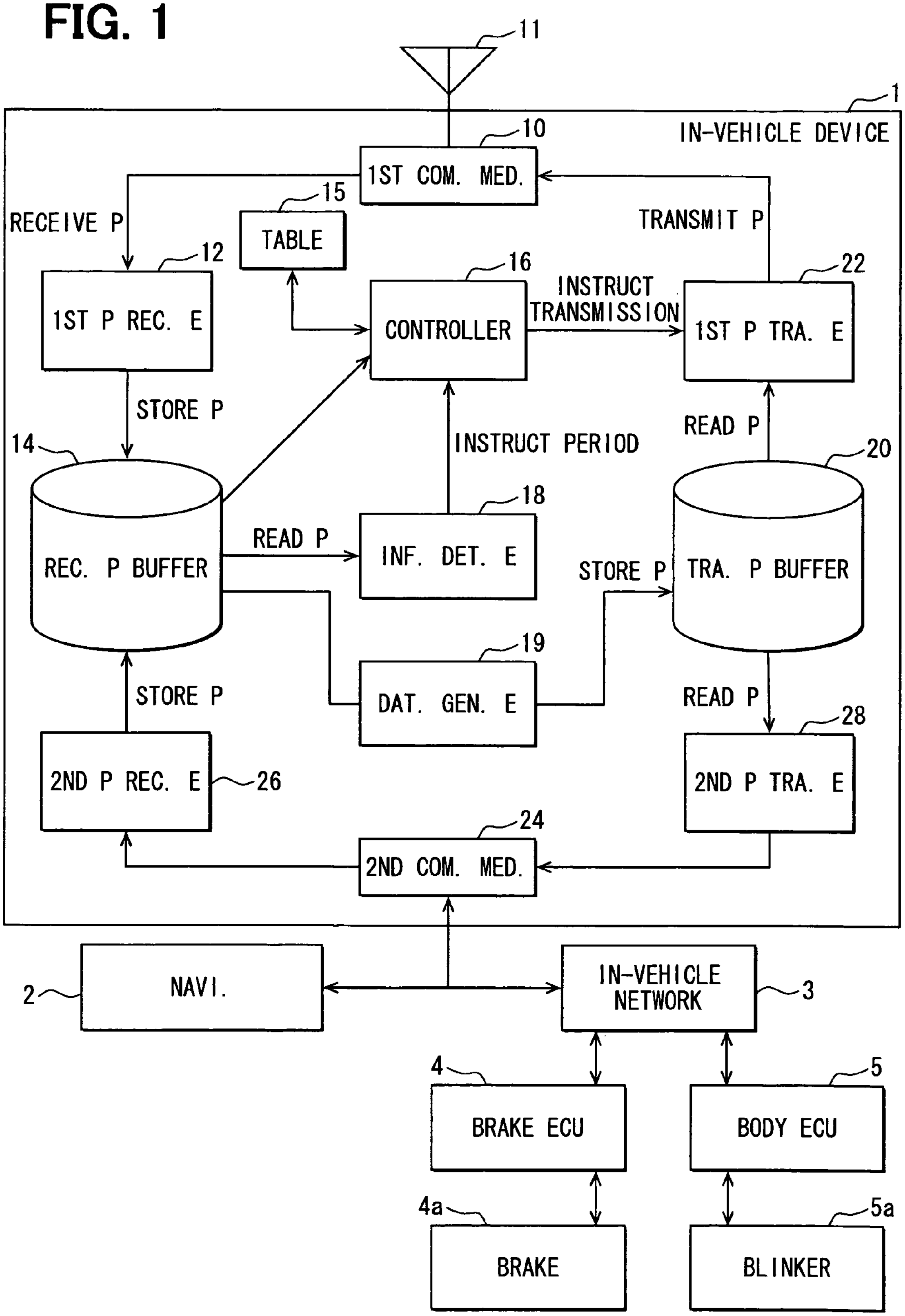
FIG. 1 is a block diagram showing an in-vehicle device.

FIG. 1 shows an in-vehicle device 1 according to a first embodiment. The device 1 is mounted on a vehicle, and includes a first communication medium 10, an antenna 11, a first packet receiving element 12, a received packet storing buffer 14, a table storage medium 15, a transmitting period controller 16, an information determining element 18, a data generating element 19, a transmitting packet storing buffer 20, a first packet transmitting element 22, a second communication medium 24, a second packet receiving element 26 and a second packet transmitting element 28.

The device 1 is coupled with an in-vehicle network 3 so that the device 1 communicates with, for example, a navigation system 2, a brake ECU 4 for controlling a brake device 4*a*, and a body ECU 5 for controlling a blinker 5*a*, i.e., a turn signal indicator. The blinker 5*a* further functions as a hazard indicator. For example, the blinker 5*a* functions as the hazard indicator when right and left turn signal indicators blink at the same time.

Figure 2:
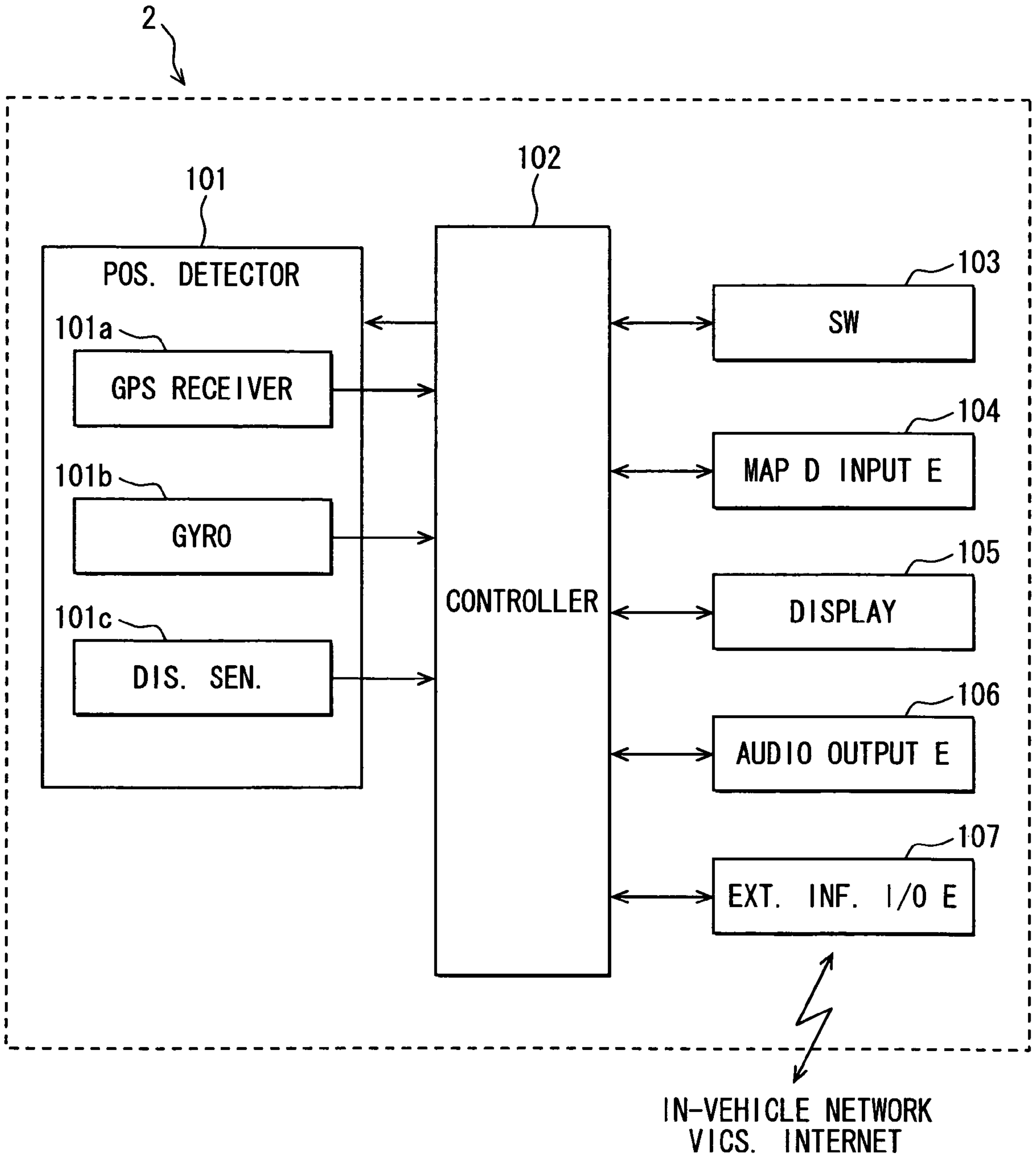
FIG. 2 is a block diagram showing a navigation system.

FIG. 2 shows the navigation system 2. The navigation system 2 includes a position detector 101, an operation switches 103, a map data input element 104, a display 105, an audio output element 106, an external information input and output element (i.e., external information I/O element) 107 and a controller 102. The position detector 101 detects a current position of the vehicle. A user of the navigation system 2 inputs various instructions via the operation switches 103. The user is, for example, a driver or a passenger of the vehicle. Map data and other information are input from an external storage medium into the navigation system 2 via the map data input element 104. The display 105 displays a map image and various information images such as a television image. The audio output element 106 outputs various sounds such as guidance voice. The controller 102 executes various process based on input information from the position detector 101, the operation switches 103, the map data input element 104, and the external information I/O element 107. Further, the controller 102 controls the position detector 101, the operation switches 103, the map data input element 104, the display 105, the audio output element 106, and the external information I/O element 107.

The position detector 101 includes a GPS (i.e., global positioning system) receiver 101*a*, a gyroscope 101*b*, and a distance sensor 101*c*. The GPS receiver 101*a* receives a radio wave from an artificial satellite in a GPS via a GPS antenna (not shown) so that the GPS receiver 101*a* detects a current position, an orientation, a speed of the vehicle and the like. The gyroscope 101*b* detects a magnitude of rotational movement, which is applied to the vehicle. The distance sensor 101*c* detects a travel distance of the vehicle based on acceleration along with a front-back direction of the vehicle and the like. Since the GPS receiver 101*a*, the gyroscope 101*b* and the distance sensor 101*c* have errors with different characteristics, the GPS receiver 101*a*, the gyroscope 101*b* and the distance sensor 101*c* are used and complement each other.

The switches 103 are integrated with the display 105. The switches 103 include a touch switch on a touch panel in the display 105 and a mechanical switch arranged around the display 105. The touch switch is displayed on a screen in the display 105. The touch panel is integrated with the display 105 so that the touch panel and the display 105 are stacked. The touch panel may be a pressure sensitive panel, an electromagnetic induction panel, a capacitive panel or a combination of these panels.

The map data input element 104 executes to input the map data stored in the storage medium. The map data includes, for example, a road link data, a node data for showing an intersection, a map matching data for improving accuracy of determination of the current position of the vehicle, a landmark data for showing facilities, an image data for route guidance, a sound data and the like. The storage medium for the map data is a CD-ROM, DVD, a hard disk drive and a memory card.

The display 105 may be a color display device such as a liquid crystal display, a plasma display, and a CRT. The display 105 displays a screen image including a map image, a vehicle mark, a guiding route for a destination, a name such as a place name, a landmark, a facility mark and the like, which are overlapped with each other. The vehicle mark shows the current position of the vehicle on the map image, and the current position is specified in view of the map data input from the map data input element 104 and the current position of the vehicle detected by the position detector 101. Here, the name, the landmark and the facility mark provide additional data. Further, the screen image may include guidance for a specific facility.

The audio output element 106 outputs a voice for guiding a facility, information of which is input from the map data input element 104. Further, the element 106 outputs a sound for various guidance, and a voice message for information obtained from the external information I/O element 107.

The external information I/O element 107 transmits information to the in-vehicle network 3, and receives information from the in-vehicle network 3. Further, the element 107 may receive FM and/or AM broadcasting signal via a radio antenna (not shown). The element 107 may receive a radio wave beacon signal and a light beacon signal from a fixed station in a vehicle information and communication system (i.e., VICS), which is arranged near a road. The received information is output to the controller 102 so that the information is processed by the controller 102. Furthermore, the element 107 may be connected to the Internet.

The controller 102 includes a conventional microcomputer having a CPU, a ROM, a RAM, an I/O unit and a bus line. The bus line couples the CPU, the ROM, the RAM and the I/O unit. According to a program stored in the ROM, the controller 102 calculates the current position of the vehicle based on a detection signal from the position detector 101. The current position is defined as a combination of coordinates and a driving direction. The controller 102 further executes to display the map image on the display 105, the map image represents a part of the map near the vehicle, which is read out by the map data input element 104. The controller 102 selects a destination among point data stored in the map data input element 104 according to operation of the switches 103. The controller 102 automatically calculates an optimum route from the current position of the vehicle to the destination.

In FIG. 1, the in-vehicle device 1 receives information about the current position, the driving direction and the vehicle speed of the vehicle, and the map data near the vehicle from the navigation system 2, the information being calculated by the navigation system 2. Further, the in-vehicle device 1 receives information about operation state of the brake device 4*a* from the brake ECU 4. The in-vehicle device 1 receives information about operation state of the blinker 5*a*. Here, the information about the subject vehicle received from the navigation system 2, the brake ECU 4, the body ECU 5 and the in-vehicle network 3 via the communication medium 24 is defined as subject vehicle information. The in-vehicle device 1 receives the subject vehicle information periodically.

The subject vehicle information received via the communication medium 24 is provided by an information packet, and sent to the second packet receiving element 26. The second packet receiving element 26 writes the subject vehicle information in the received packet storing buffer 14. Thus, the subject vehicle information received via the in-vehicle network 3 from the navigation system 2 is stored in the received packet storing buffer 14.

The in-vehicle device 1 receives information about other vehicles running around the vehicle by wireless from in-vehicle devices in the other vehicles via the antenna 11 and the communication medium 10. The information is provided by an information packet. The information about the other vehicles includes a current position, a driving direction and a vehicle speed of each of the other vehicles. Here, the information about the other vehicles is defined as other vehicle information.

The other vehicle information received via the antenna 11 and the communication medium 10 is provided by an information packet and sent to the first packet receiving element 12. The first packet receiving element 12 writes the other vehicle information in the received packet storing buffer 14. Thus, the received packet storing buffer 14 stores the other vehicle information, which is received from the other vehicle around the subject vehicle.

The data generating element 19 generates subject vehicle data based on the subject vehicle information stored in the received packet storing buffer 14 so that the subject vehicle data is sent to the other vehicles. The data generating element 19 writes the subject vehicle data in the transmitting packet storing buffer 20. The data generating element 19 further generates other vehicle data based on the other vehicle information stored in the received packet storing buffer 14 so that the other vehicle data is sent to the navigation system 2 and/or the in-vehicle network 3. The data generating element 19 writes the other vehicle data in the transmitting packet storing buffer 20.

The second packet transmitting element 28 reads out predetermined information to be sent to the navigation system 2 and/or the in-vehicle network 3 among the other vehicle data stored in the transmitting packet storing buffer 20. The second packet transmitting element 28 transmits the read out other vehicle data to the navigation system 2 and/or the in-vehicle network 3 via the communication medium 24.

The first packet transmitting element 22 reads out the subject vehicle data stored in the transmitting packet storing buffer 20. The first packet transmitting element 22 transmits the read out subject vehicle data to the other vehicles around the vehicle via the communication medium 10 and the antenna 11 by radio.

The transmitting period controller 16 controls a transmission period of the first packet transmitting element 22. Specifically, the controller 16 reads out information about the vehicle speed of the subject vehicle from the information stored in the received packet storing buffer 14. Based on the vehicle speed, the controller 16 calculates an optimum transmission period. Here, the controller 16 calculates the optimum transmission period with reference to a table stored in the table storage medium 15. The table defines a relationship between the vehicle speed and the optimum transmission period. In the table in the table storage medium 15, as the vehicle speed becomes larger, the optimum transmission period becomes shorter.

The transmitting period controller 16 outputs an instruction to the first packet transmitting element 22 so that the first packet transmitting element 22 transmits information with the calculated optimum transmission period. The first packet transmitting element 22 transmits the subject vehicle information with the optimum transmission period, which is instructed by the transmitting period controller 16.

Figure 3:
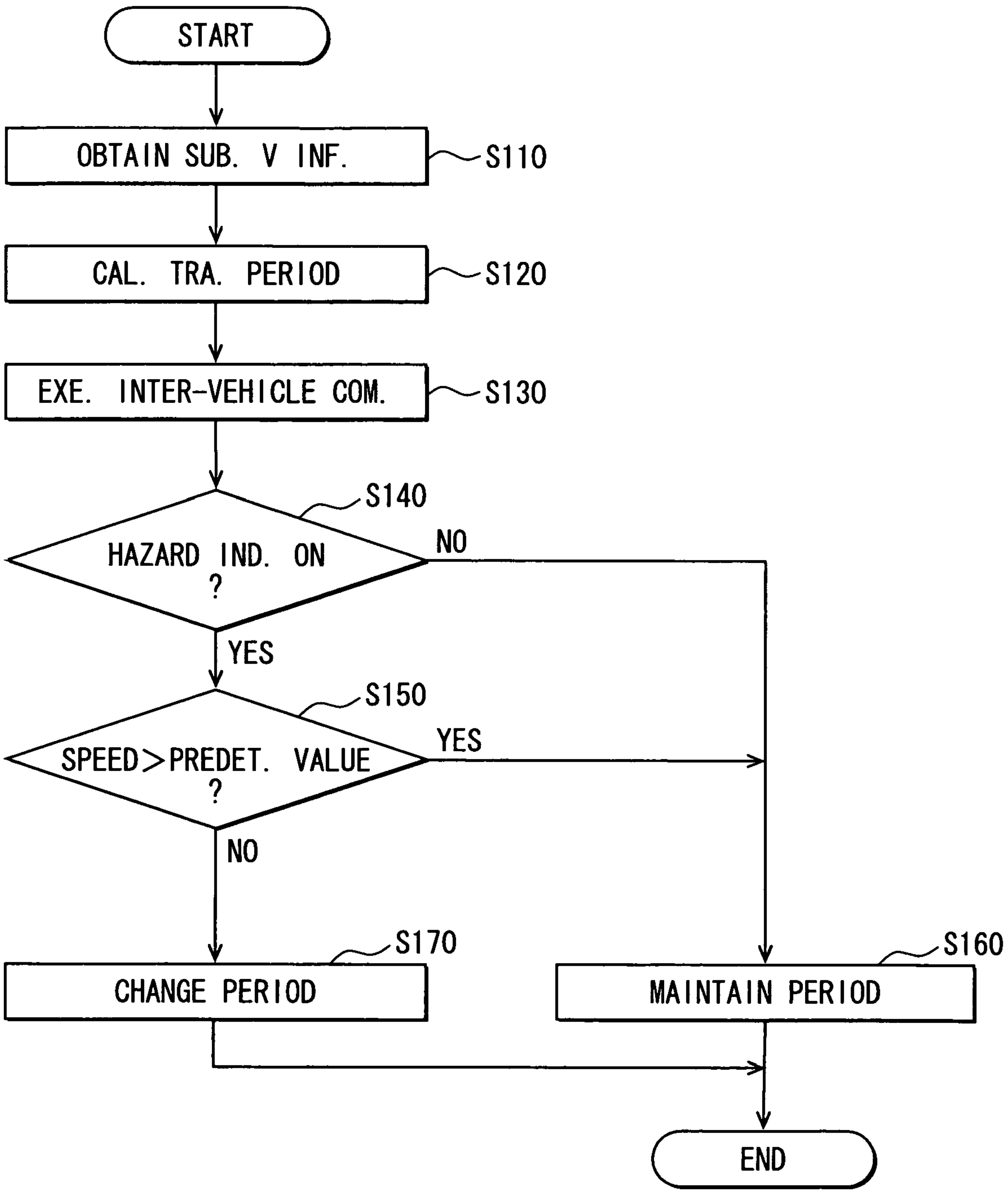
FIG. 3 is a flowchart showing a transmission period control process executed by information determining element in the in-vehicle device according to a first embodiment.

The information determining element 18 executes a transmission period control process shown in FIG. 3 periodically. In Step S110 of the process, the element 18 obtains the subject vehicle information stored in the received packet storing buffer 14.

In Step S120, the element 18 calculates an optimum transmission period, which is determined by the vehicle speed, based on the information about the vehicle speed in the subject vehicle information. Specifically, the element 18 refers to the table in the table storage medium 15 so as to calculate the optimum transmission period.

In Step S130, the element 18 controls the first packet transmitting element 22 to transmit the subject vehicle information to the other vehicles with the calculated transmission period. Thus, the inter-vehicle communication is performed by the first packet transmitting element 22.

In Step S140, the element 18 determines based on the subject vehicle information whether the hazard indicator 5*a* of the subject vehicle turns on.

When the element 18 determines that the hazard indicator 5*a* turns on, i.e., it is determined to "Yes" in Step S140, it proceeds to Step S150. In Step S150, the element 18 determines whether the vehicle speed of the subject vehicle is larger than a predetermined value.

When the element 18 determines that the vehicle speed is larger than the predetermined value, i.e., it is determined to "Yes" in Step S150, it proceeds to Step S160. In Step S160, the element 18 outputs an instruction not to change the transmission period to the transmitting period controller 16. In this case, the transmitting period controller 16 outputs an instruction to the first packet transmitting element 22, and the instruction to transmit the subject vehicle information is not changed. Specifically, the transmission period of the first packet transmitting element 22 remains to the optimum transmission period, which is determined based on the vehicle speed of the subject vehicle. After Step S160, the transmission period control process ends.

In Step S150, when the element 18 determines that the vehicle speed is not larger than the predetermined value, i.e., it is determined to "No" in Step S150, it proceeds to Step S170. In Step S170, the element 18 outputs an instruction to change the transmission period to the transmitting period controller 16. Specifically, the instruction of the element 18 is to change the transmission period to another optimum transmission period corresponding to the high vehicle speed higher than the predetermined value. In this case, since the hazard indicator 5*a* turns on, it is necessary to inform other drivers in other vehicle around the subject vehicle of existence of the subject vehicle. Thus, the transmission period of the information becomes shorter. After Step S170, the transmission period control process ends.

In Step S140, when the element determines that the hazard indicator 5*a* does not turn on, i.e., it is determined to "No" in Step S140, it proceeds to Step S160. In Step S160, the element 18 outputs the instruction not to change the transmission period to the transmitting period controller 16.

Figure 4:
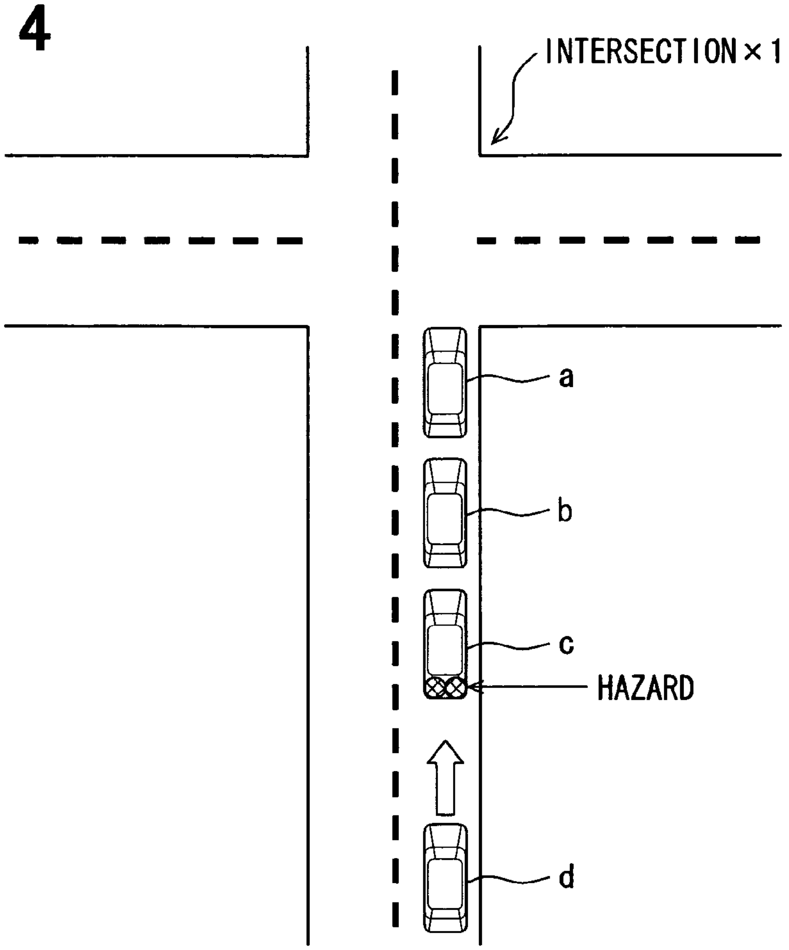
FIG. 4 is a diagram showing function of the in-vehicle device according to the first embodiment.

FIG. 4 shows a certain situation for explaining a function of the in-vehicle device 1. Vehicles a, b, c approach the same intersection X1 at low speed. The hazard indicator 5*a* of the vehicle c turns on to alert a driver in another vehicle d, which comes behind the vehicle c, so that the other vehicle d does not bump into the rear of the vehicle c.

Each vehicle a, b, c has the in-vehicle device 1 so that the inter-vehicle communication is performed among the vehicles a, b, c. Specifically, information of one vehicle is transmitted to other two vehicles. In this case, the transmission period of the in-vehicle device 1 is controlled as follows.

In Step S120, the in-vehicle device 1 in each of the vehicles a, b, c calculates the transmission period according to the low vehicle speed so that the transmission period is long. Specifically, the transmitting period controller 16 obtains the information in the table storage medium 15 so that the transmission period corresponding to the low speed is calculated. In Step S130, the controller 16 transmits an instruction to the first packet transmitting element 22 so that the first packet transmitting element 22 transmits information to the other vehicles with the calculated transmission period.

In Step S140, the in-vehicle device 1 in each of the vehicles a, b, c determines whether the hazard indicator 5*a* of the vehicle turns on. In this case, the in-vehicle devices 1 of the vehicles a, b determine that the hazard indicator 5*a* does not turn on, i.e., it is determined to "No" in Step S140. Thus, it goes to Step S160, so that the in-vehicle device sets the long transmission period corresponding to the low vehicle speed. The in-vehicle device 1 of the vehicle c determines that the hazard indicator 5*a* turns on, i.e., it is determined to "Yes" in Step S140. Thus, it goes to Step S170, so that the in-vehicle device 1 sets the short transmission period.

As shown in FIG. 4, when the vehicle c runs at low speed, and the hazard indicator 5*a* of the vehicle c turns on, the transmission period of the in-vehicle device 1 in the vehicle c becomes short. When another vehicle d approaches from behind the vehicles a, b, c, the in-vehicle device 1 in the other vehicle d can catch the information about the existence of the vehicle c from the in-vehicle device 1 in the vehicle c. Thus, the in-vehicle device 1 in the other vehicle can detect the existence of the vehicle c without large time delay. Accordingly, it is avoidable to delay the detection of the existence of the vehicle c by the in-vehicle device 1 in the other vehicle d. For example, it is avoidable to collide the other vehicle d on the vehicle c. Accordingly, safety of the vehicles a, b, c, d is improved.

The first packet transmitting element 22 is a transmitter for executing Step S130. The transmitting period controller 16 and the information determining element 18 provide a transmission controller for executing Steps S160 and S170. A detection element for a warning element such as the hazard indicator 5*a* executes Step S140. A transmission period calculation element executes Step S120.

Second Embodiment

Figure 5:
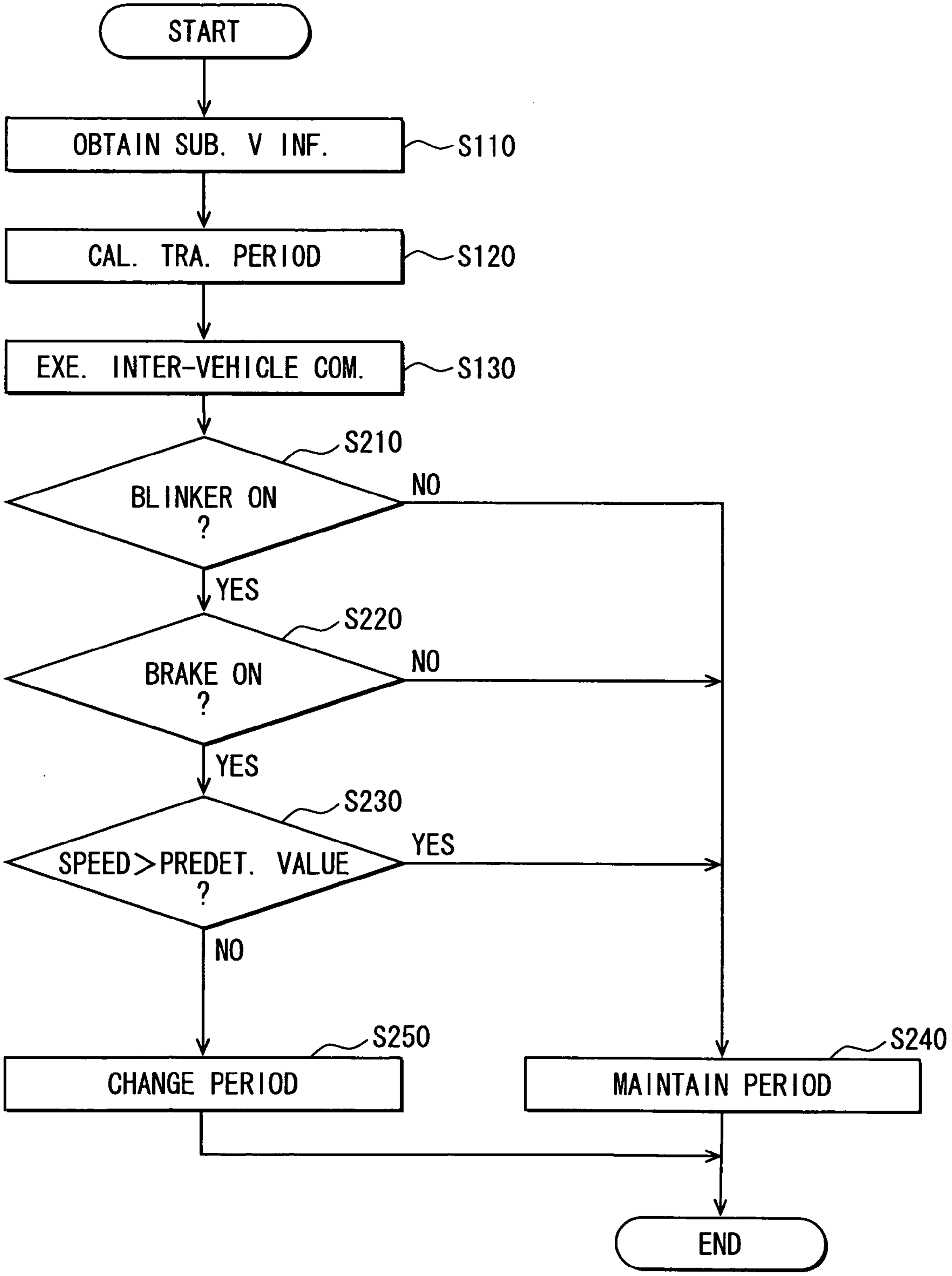
FIG. 5 is a flowchart showing another transmission period control process executed by information determining element in the in-vehicle device according to a second embodiment.
Figure 7A:
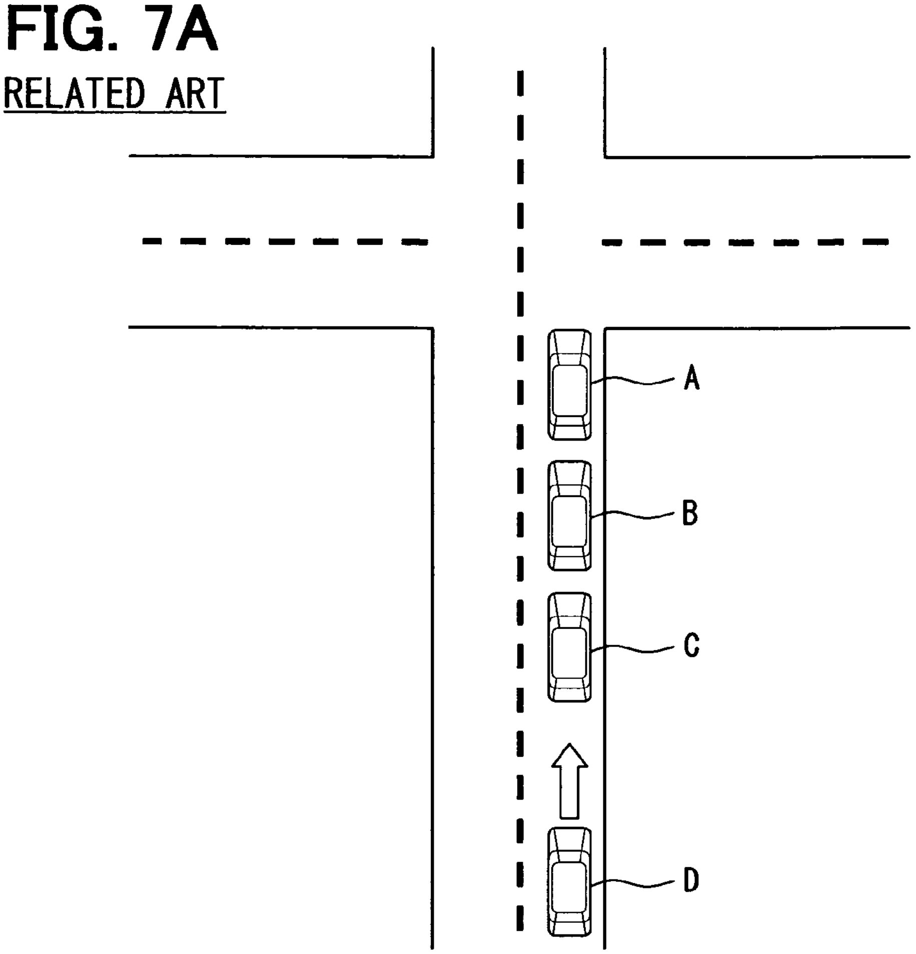
FIG. 7A RELATED ART
FIGS. 7A and 7B are diagrams showing example situations according to a related art.
Figure 7B:
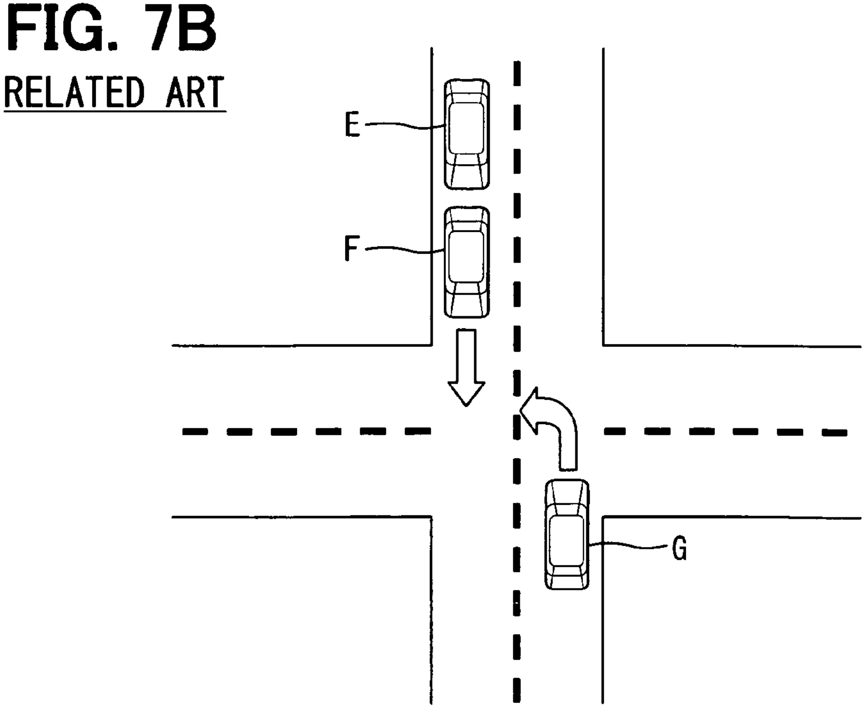
FIG. 7B RELATED ART

In an in-vehicle device 1 according to a second embodiment, the information determining element 18 executes the transmission period control process shown in FIG. 5 periodically.

In FIG. 5, after Step S130, it goes to step S210. In Step S210, the information determining element 18 determines whether the blinker 5*a* of the vehicle functions on the basis of the information of the subject vehicle, which is obtained in Step S110. When the information determining element 18 determines that the blinker 5*a* functions, i.e., it is determined to "Yes" in Step S210, it goes to Step S220.

In Step S220, the information determining element 18 determines whether the brake device 4*a* of the vehicle functions. Specifically, the brake device 4*a* generates a braking force.

When the information determining element 18 determines that the brake device 4*a* functions, i.e., it is determined to "Yes" in Step S220, it goes to Step S230. In Step S230, the information determining element 18 determines whether the vehicle speed of the subject vehicle is larger than a predetermined value.

When the information determining element 18 determines that the vehicle speed of the subject vehicle is larger than the predetermined value, i.e., it is determined to "Yes" in Step S230, it goes to Step S240. In Step S240, the element 18 outputs an instruction not to change the transmission period to the transmitting period controller 16. In this case, the transmitting period controller 16 outputs an instruction to the first packet transmitting element 22, and the instruction to transmit the subject vehicle information is not changed. Specifically, the transmission period of the first packet transmitting element 22 remains to the optimum transmission period, which is determined based on the vehicle speed of the subject vehicle. After Step S240, the transmission period control process ends.

In Step S230, when the element 18 determines that the vehicle speed is not larger than the predetermined value, i.e., it is determined to "No" in Step S230, it proceeds to Step S250.

In Step S250, the element 18 outputs an instruction to change the transmission period to the transmitting period controller 16. Specifically, the instruction of the element 18 is to change the transmission period to another optimum transmission period corresponding to the high vehicle speed higher than the predetermined value. In this case, since the blinker 5*a* turns on and the brake device 54*a* functions, the element 18 determines that the subject vehicle, for example, turns right or left, or the element 18 determines that the subject vehicle changes a traffic lane. Thus, the transmission period of the information becomes shorter. After Step S250, the transmission period control process ends.

When the element 18 determines that the blinker 5*a* does not function, i.e., it is determined to "No" in Step S210, it goes to Step S240. Further, when the element 18 determines that the brake device 4*a* dose not function, i.e., it is determined to "No" in Step S220, it goes to Step 240. In Step S240, the element 18 outputs an instruction not to change the transmission period to the transmitting period controller 16. In this case, the transmission period of the first packet transmitting element 22 remains to the optimum transmission period, which is determined based on the vehicle speed of the subject vehicle. After Step S240, the transmission period control process ends.

Figure 6:
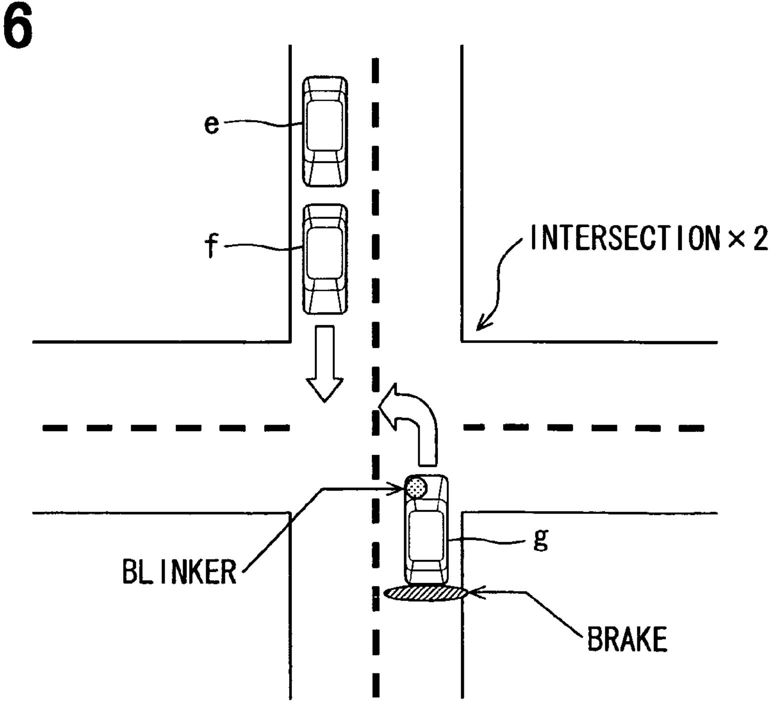
FIG. 6 is a diagram showing function of the in-vehicle device according to the second embodiment.

FIG. 6 shows a certain situation for explaining a function of the in-vehicle device 1. In FIG. 6, the vehicles e-g approach an intersection X2. Two vehicles e, f go through the intersection X2 from an up side to a down side of the drawing of FIG. 6. The other vehicle g is to turn left at the intersection X2 after the two vehicles e, f pass through the intersection X2. The vehicle g temporally stops in the intersection X2, or the vehicle g proceeds into the intersection X2 at low speed.

The in-vehicle device 1 in the other vehicle g calculates the transmission period corresponding to the low vehicle speed since the subject vehicle runs at low speed, or since the subject vehicle temporally stops. In this case, the transmission period becomes long since the transmission period is calculated based on the low vehicle speed. Specifically, the transmitting period controller 16 obtains the information in the table storage medium 15 so that the transmission period corresponding to the low speed is calculated. The controller 16 transmits an instruction to the first packet transmitting element 22 so that the first packet transmitting element 22 transmits information to the other vehicles with the calculated transmission period.

The in-vehicle device 1 in the other vehicle g detects that the blinker 5*a* of the vehicle functions, i.e., a left side blinker 5*a* turns on to show a left turn. This corresponds to "Yes" in Step S210. Further, the device 1 detects that the brake device 4*a* functions, i.e., it is determined to"Yes" in Step S220. When the vehicle speed is larger than the predetermined value, the transmission period is set to be shorter, compared with the long transmission period corresponding to the low vehicle speed. These correspond to "No" in Step S230 and Step S250.

As shown in FIG. 6, when the other vehicle g runs into the intersection at low speed, or the other vehicle g stops at the intersection X2 in order to turn left, and the blinker 5*a* functions to represent the left turn and the brake device 4*a* functions, the transmission period of the in-vehicle device 1 in the other vehicle g becomes short. Accordingly, when the two vehicles e, f approach the intersection X2, the in-vehicle devices 1 of the two vehicles e, f can detect the existence of the other vehicle g. Thus, it is avoidable to delay the detection of the existence of the vehicle g by the in-vehicle device 1 in the other vehicle e, f. For example, it is avoidable to collide the other vehicle g on the vehicle e, f. Accordingly, safety of the vehicles e, f, g is improved.

Although the in-vehicle device 1 refers to the table in the table storage medium 15 so that the transmission period corresponding to the vehicle speed is calculated, the in-vehicle device 1 may calculate the transmission period without referring to the table.

In the first embodiment, the in-vehicle device 1 determines whether the hazard indicator 5*a* turns on, so that the transmission period is controlled. Alternatively, the in-vehicle device 1 may determine whether the brake device 4*a* functions, so that the transmission period is controlled. Specifically, when the vehicle speed of the vehicle is low, the hazard indicator 5*a* functions, and the brake device 4*a* functions, the transmission period is set to be short.

The in-vehicle device as an inter-vehicle communication device may have the following structure. In the device, when an indicator such as the blinker and the hazard indicator functions, and other vehicles approach the intersection, at which the subject vehicle approaches, the transmission period is set to be short, compared with a usual transmission period.

The indicator may functions together with a shift lever. The shift lever selects a moving state of the vehicle such that a driving position represents to move the vehicle forward and a reverse position represents to move the vehicle backward. When the reverse position is selected, the transmission period becomes shorter so that the existence of the vehicle is rapidly informed to a person around the vehicle.

Alternatively, the indicator may be a monitor for monitoring air pressure of a tire of the vehicle so that the monitor determines whether the air pressure of the tire is proper. Further, the monitor alerts emergency of the tire. When the monitor determines that the air pressure of the tire is out of a proper range, the transmission period becomes shorter so that the emergency of the vehicle is rapidly informed to a person around the vehicle.

Alternatively, the transmission period may be changed in accordance with an operating time of the brake and/or the indicator such as the blinker, the hazard indicator, a shift lever indicator and the monitor for the tire.

For example, when the operating time is shorter than a predetermined time, it is considered that operation of the indicator may not be operated by mistake or may not indicate emergency. For example, when a driver expresses a greeting message, the driver may turn on the indicator in a short time. Thus, when the operating time is shorter than the predetermined time, the transmission period is not changed. On the other hand, when the operating time is longer than the predetermined time, the transmission period is changed to be shorter.

The above disclosure has the following aspects.

According to a first aspect of the present disclosure, an inter-vehicle communication device for a vehicle includes: a transmission element for transmitting information about the vehicle to other vehicles with a predetermined period; a transmission controller for controlling the transmission element; and a detector for detecting a state of an indicator in the vehicle. The indicator informs a person around the vehicle about a state and existence of the vehicle, and the transmission controller controls the transmission element to transmit the information with a period shorter than the predetermined period when the detector detects that the indicator functions.

The indicator provides to avoid accident by indicating warning to other vehicles in case of, for example, emergency. Alternatively, the indicator may inform a driving direction and/or existence of the vehicle to the other vehicles. Thus, the indicator shows the state of the vehicle and the existence of the vehicle to the vehicles. Since the transmission controller controls the transmission element to transmit the information with a period shorter than the predetermined period when the detector detects that the indicator functions, the existence of the vehicle is informed to the other vehicles immediately.

Alternatively, the inter-vehicle communication device may further include: a second detector for detecting a state of a brake device in the vehicle. The transmission controller controls the transmission element to transmit the information with the period shorter than the predetermined period when the detector detects that the indicator functions and the second detector detects that the brake device generates a braking force. Since the existence of the vehicle is informed to the other vehicles immediately, the accident such as rear end collision is avoidable.

Alternatively, the inter-vehicle communication device may further include: a calculator for calculating the period in such a manner that the period is shorter as a speed of the vehicle becomes larger. The transmission controller controls the transmission element to transmit the information with the calculated period when the detector detects that the indicator functions and the speed of the vehicle is larger than a predetermined speed. Here, the technique that the transmission period is shorter as the vehicle speed becomes larger is disclosed in, for example, JP-A-2000-90395. Accordingly, since the well-known technique for the inter-vehicle communication device can be used, the above device has broad utility. For example, the above technique may be performed by a conventional soft ware and/or a conventional method, so that a cost for development can be reduced. Further, the transmission controller may control the transmission element to transmit the information with the calculated period when the detector detects that the indicator stops functioning. In this case, the broad utility of the device is much improved.

Alternatively, the inter-vehicle communication device may further include: a calculator for calculating the period in such a manner that the period is shorter as a speed of the vehicle becomes larger. The transmission controller controls the transmission element to transmit the information with the calculated period when the detector detects that the indicator stops functioning. In this case, the broad utility of the device is much improved.

Alternatively, the inter-vehicle communication device may further include: a calculator for calculating the period in such a manner that the period is shorter as a speed of the vehicle becomes larger. The transmission controller controls the transmission element to transmit the information with the calculated period when the detector detects that the indicator functions, the second detector detects that the brake device generates the braking force, and the speed of the vehicle is larger than a predetermined speed. Further, the transmission controller may control the transmission element to transmit the information with the calculated period when the detector detects that the indicator stops functioning or the second detector detects that the brake device stops generating the braking force.

Alternatively, the inter-vehicle communication device may further include: a calculator for calculating the period in such a manner that the period is shorter as a speed of the vehicle becomes larger. The transmission controller controls the transmission element to transmit the information with the calculated period when the detector detects that the indicator stops functioning or the second detector detects that the brake device stops generating the braking force.

Alternatively, the indicator may be a blinker for showing a turning direction of the vehicle. Alternatively, the indicator may be a hazard indicator for showing emergency of the vehicle.

Alternatively, the inter-vehicle communication device may further include: a first obtaining element for obtaining information about a first intersection, at which the vehicle approaches, wherein the first intersection is the nearest intersection of the vehicle and disposed along with a traveling direction of the vehicle; a receiving element for receiving information about the other vehicles, which is transmitted from the other vehicles; a second obtaining element for obtaining information about a second intersection, at which the other vehicle approaches, wherein the second intersection is the nearest intersection of the other vehicle and disposed along with a traveling direction of the other vehicle; and a determining element for determining whether the second intersection coincides with the first intersection. The transmission controller controls the transmission element to transmit the information with the period shorter than the predetermined period when the detector detects that the indicator functions and the determining element determines that the second intersection coincides with the first intersection.

Alternatively, the inter-vehicle communication device may further include: a first obtaining element for obtaining information about a first intersection, at which the vehicle approaches, wherein the first intersection is the nearest intersection of the vehicle and disposed along with a traveling direction of the vehicle; a receiving element for receiving information about the other vehicles, which is transmitted from the other vehicles; a second obtaining element for obtaining information about a second intersection, at which the other vehicle approaches, wherein the second intersection is the nearest intersection of the other vehicle and disposed along with a traveling direction of the other vehicle; and a determining element for determining whether the second intersection coincides with the first intersection. The transmission controller controls the transmission element to transmit the information with the period shorter than the predetermined period when the detector detects that the indicator functions, the second detector detects that the brake device generates the braking force, and the determining element determines that the second intersection coincides with the first intersection.

According to a second aspect of the present disclosure, a method for communicating between vehicles includes: obtaining information about a vehicle; detecting a speed of the vehicle; calculating a transmission period as a first transmission period when the speed of the vehicle is not larger than a predetermined value; calculating the transmission period as a second transmission period when the speed of the vehicle is larger than the predetermined value, wherein the second transmission period is shorter than the first transmission period; transmitting the information about the vehicle to other vehicles with the calculated transmission period; determining whether a hazard indicator turns on; determining whether the speed of the vehicle is larger than the predetermined value; maintaining the calculated transmission period when the hazard indicator does not turn on or the vehicle speed is larger than the predetermined value; and changing the calculated transmission period to the second transmission period when the hazard indicator turns on and the vehicle speed is not larger than the predetermined value.

The above method provides to inform the existence of the vehicle to the other vehicles immediately.

According to a third aspect of the present disclosure, a method for communicating between vehicles includes: obtaining information about a vehicle; detecting a speed of the vehicle; calculating a transmission period as a first transmission period when the speed of the vehicle is not larger than a predetermined value; calculating the transmission period as a second transmission period when the speed of the vehicle is larger than the predetermined value, wherein the second transmission period is shorter than the first transmission period; transmitting the information about the vehicle to other vehicles with the calculated transmission period; determining whether a blinker indicator turns on; determining whether a brake device functions; determining whether the speed of the vehicle is larger than the predetermined value; maintaining the calculated transmission period when the blinker does not turn on, the brake device does not function, or the vehicle speed is larger than the predetermined value; and changing the calculated transmission period to the second transmission period when the blinker turns on, the brake device functions, and the vehicle speed is not larger than the predetermined value.

The above method provides to inform the existence of the vehicle to the other vehicles immediately.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An inter-vehicle communication device mounted on a vehicle comprising:

a transmission device for transmitting information about the vehicle to other vehicles around the vehicle with a predetermined transmission period; and a transmission control device for controlling the transmission device, wherein the inter-vehicle communication device further comprises:

a speed detection device for detecting a speed of the vehicle;

a transmission period calculation device for calculating the transmission period in such a manner that the transmission period is shorter as the speed of the vehicle becomes larger;

a warning element state detection device for detecting an operation state of a warning element, which is mounted on the vehicle in order to inform a person around the vehicle of a state of the vehicle and existence of the vehicle; and a speed determination device for determining whether the speed of the vehicle detected by the speed detection device is larger than a predetermined speed, wherein the transmission control device controls the transmission device to transmit the information with a period shorter than the transmission period calculated by the transmission period calculation device according to the speed of the vehicle when the speed determination device determines that the speed of the vehicle detected by the speed detection device is equal to or smaller than the predetermined speed, and it is determined on the basis of a detection result of the warning element state detection device that the warning element functions.

2. The inter-vehicle communication device according to claim 1, further comprising:

a brake element state detection device for detecting an operation state of a brake element in the vehicle, wherein the transmission control device controls the transmission device to transmit the information with the period shorter than the transmission period calculated by the transmission period calculation device according to the speed of the vehicle when the speed determination device determines that the speed of the vehicle detected by the speed detection device is equal to or smaller than the predetermined speed when it is determined on the basis of a detection result of the warning element state detection device that the warning element functions, and when it is determined on the basis of a detection result of the brake element state detection device that the brake element generates a braking force.

3. The inter-vehicle communication device according to claim 1, wherein the transmission control device controls the transmission device to transmit the information of the vehicle with the transmission period calculated by the transmission period calculation device according to the speed of the vehicle when the speed determination device determines that the speed of the vehicle detected by the speed detection device is larger than the predetermined speed, and when it is determined on the basis of a detection result of the warning element state detection device that the warning element functions.

4. The inter-vehicle communication device according to claim 1, wherein the transmission control device controls the transmission device to transmit the information of the vehicle with the transmission period calculated by the transmission period calculation device when it is determined on the basis of a detection result of the warning element state detection device that the warning element stops functioning.

5. The inter-vehicle communication device according to claim 2, wherein the transmission control device controls the transmission device to transmit the information of the vehicle with the transmission period calculated by the transmission period calculation device according to the speed of the vehicle when the speed determination device determines that the speed of the vehicle detected by the speed detection device is larger than the predetermined speed, when it is determined on the basis of a detection result of the warning element state detection device that the warning element functions, and when it is determined on the basis of a detection result of the brake element state detection device that the brake element generates the braking force.

6. The inter-vehicle communication device according to claim 2, wherein the transmission control device controls the transmission device to transmit the information of the vehicle with the transmission period calculated by the transmission period calculation device when it is determined on the basis of a detection result of the warning element state detection device that the warning element stops functioning, or when it is determined on the basis of a detection result of the brake element state detection device that the brake element stops functioning and does not generate the braking force.

7. The inter-vehicle communication device according to claim 1, wherein the warning element is a blinker for informing a person around the vehicle of a traveling direction of the vehicle.

8. The inter-vehicle communication device according to claim 1, wherein the warning element is a hazard indicator of the vehicle.

9. The inter-vehicle communication device according to claim 1, further comprising:

a first obtaining element for obtaining information about a first intersection, at which the vehicle approaches, wherein the first intersection is the nearest intersection to the vehicle and disposed along a traveling direction of the vehicle;

a receiving element for receiving information about the other vehicles, which is transmitted from the other vehicles;

a second obtaining element for obtaining information about a second intersection, at which the other vehicle approaches, wherein the second intersection is the nearest intersection to the other vehicle and disposed along a traveling direction of the other vehicle; and a determining element for determining whether the second intersection coincides with the first intersection, wherein the transmission control device controls the transmission device to transmit the information with the period shorter than the transmission period calculated by the transmission period calculation device when it is determined on the basis of the detection result of the warning element state detection device that the warning element functions, and the determining element determines that the second intersection coincides with the first intersection.

10. The inter-vehicle communication device according to claim 2, further comprising:

a first obtaining element for obtaining information about a first intersection, at which the vehicle approaches, wherein the first intersection is the nearest intersection to the vehicle and disposed along a traveling direction of the vehicle;

a receiving element for receiving information about the other vehicles, which is transmitted from the other vehicles;

a second obtaining element for obtaining information about a second intersection, at which the other vehicle approaches, wherein the second intersection is the nearest intersection to the other vehicle and disposed along a traveling direction of the other vehicle; and a determining element for determining whether the second intersection coincides with the first intersection, wherein the transmission control device controls the transmission device to transmit the information with the period shorter than the transmission period calculated by the transmission period calculation device when it is determined on the basis of a detection result of the warning element state detection device that the warning element functions, when it is determined on the basis of a detection result of the brake element state detection device that the brake element generates a braking force, and when the determining element determines that the second intersection coincides with the first intersection.

* * * * *